(12) United States Patent
Cosneau et al.

(10) Patent No.: US 10,890,477 B2
(45) Date of Patent: Jan. 12, 2021

(54) METHOD FOR ASCERTAINING THE CAPACITY OF GLASS CONTAINERS

(71) Applicant: TIAMA, Vourles (FR)

(72) Inventors: Laurent Cosneau, Soucieu-en-Jarrest (FR); Olivier Colle, Oullins (FR)

(73) Assignee: TIAMA, Vourles (FR)

( * ) Notice: Subject to any disclaimer, the term of this patent is extended or adjusted under 35 U.S.C. 154(b) by 226 days.

(21) Appl. No.: 16/305,416

(22) PCT Filed: Jun. 5, 2017

(86) PCT No.: PCT/FR2017/051414
§ 371 (c)(1),
(2) Date: Nov. 29, 2018

(87) PCT Pub. No.: WO2017/212156
PCT Pub. Date: Dec. 14, 2017

(65) Prior Publication Data
US 2020/0319010 A1   Oct. 8, 2020

(30) Foreign Application Priority Data

Jun. 9, 2016 (FR) ..................... 16 55290

(51) Int. Cl.
*G01F 17/00* (2006.01)
*G06T 11/00* (2006.01)
(Continued)

(52) U.S. Cl.
CPC ................ *G01F 17/00* (2013.01); *G06T 7/62* (2017.01); *G06T 7/68* (2017.01); *G06T 11/008* (2013.01); *G06T 2207/10081* (2013.01)

(58) Field of Classification Search
CPC ... G01F 17/00; G06T 7/68; G06T 7/62; G06T 11/008; G06T 2207/10081
(Continued)

(56) References Cited

U.S. PATENT DOCUMENTS

2010/0303287 A1   12/2010   Morton
2014/0211980 A1   7/2014    Bouchard et al.
(Continued)

OTHER PUBLICATIONS

Anthon Du Plessis, "CT News: The Stellenbosch CT scanner facility newsletter", vol. 2, No. 1, Jan. 31, 2014.
(Continued)

*Primary Examiner* — David P Porta
*Assistant Examiner* — Gisselle M Gutierrez
(74) *Attorney, Agent, or Firm* — Clark & Brody LP

(57) ABSTRACT

A method of determining the capacity of containers (1) comprises using an X-ray computed-tomography apparatus (10) to acquire a plurality of X-ray images (I) of the container at different projection angles. The X-ray images are analyzed in order to construct a model of the container from the X-ray images, determine the inside surface of the digital model of the container, position a filling level plane on the digital model of the container parallel to the support surface and at a nominal distance from the top of the digital model of the container, and measure by calculation the inside volume of the digital model of the container as defined by the inside surface of the digital model and by the filling level plane, the measurement being the filling capacity of the container.

13 Claims, 4 Drawing Sheets

(51) Int. Cl.
*G06T 7/62* (2017.01)
*G06T 7/68* (2017.01)

(58) Field of Classification Search
USPC .......................................................... 378/10
See application file for complete search history.

(56) References Cited

U.S. PATENT DOCUMENTS

| | | | |
|---|---|---|---|
| 2015/0335304 A1* | 11/2015 | Lavi | A61B 5/02007 600/407 |
| 2015/0339847 A1* | 11/2015 | Benishti | G16H 30/20 382/131 |
| 2018/0177474 A1* | 6/2018 | Benishti | A61M 5/007 |
| 2019/0180880 A1* | 6/2019 | Lavi | G16H 50/50 |
| 2019/0304592 A1* | 10/2019 | Ma | G06T 17/00 |
| 2020/0251223 A1* | 8/2020 | Lavi | G06T 7/0012 |

OTHER PUBLICATIONS

Kruth et al., "Computed tomography for dimensional metrology", CIRP Annals, vol. 60, No. 2, Jul. 13, 2011, pp. 821-842.

* cited by examiner

METHOD FOR ASCERTAINING THE CAPACITY OF GLASS CONTAINERS

The present invention relates to the technical field of inspecting the dimensions of glass containers, in the general sense, and the invention relates more particularly to measuring the capacity of such containers.

The capacity of a container is the minimum volume of liquid that it contains if it is filled to the brim or up to a determined height under the surface of the ring of the container. Regulatory or administrative requirements make it necessary to know the capacity of containers accurately. The real capacity of a container must correspond to the capacity marked on the container, which may for example be etched on the container or written on a label applied to the container.

Deviations in the method of fabricating containers lead to variations in their capacity. For a constant volume of glass, if the volume of the mold increases as a result of wear, then the inside volume of the container will increase. At constant mold volume, if the volume of glass increases, then the capacity of the container will decrease. Likewise, variations in shape (height, ovalization of the body, etc.) can have an influence on the capacity of containers. In order to measure the volume characteristics of molds, patent FR 2 717 574 teaches a method and a device for gauging the cavity of a glassmaking mold.

By way of example, a known machine for measuring the capacity of containers is sold by the supplier AGR International Inc. (http://www.agrinti.com/products/view/10/Fill-Height-Tester), which relies on the principle of weighing. That machine has a weighing slab on which the empty container bears, standing on its bottom, in static equilibrium under gravity on a horizontal support surface. Thereafter, the container is filled with a liquid of known density up to a nominal level measured relative to the base plane defined by the weighing slab. The container is filled to the nominal level by filling the container to above the nominal level and removing the excess volume by means of a pipette bearing against the surface of the ring of the container in such a manner that the orifice of the pipette is situated at the nominal level relative to the base plane. By weighing at a known temperature, that machine measures the quantity of liquid that is actually contained inside the container and that corresponds to the effective capacity of the container.

A drawback of that machine relates to the time required for taking the measurement. Furthermore, that machine presents the drawback of not being able to take additional dimensional measurements, other than the weight of the container when empty. That machine is thus used in addition to automatic dimensional inspection apparatuses of the optical or contact type, but that do not enable the capacity of containers to be measured.

Also known, from Document US 2014/211980, is an X-ray method and apparatus for measuring the volume of a liquid partially filling a bottle, in particular by detecting the surface of the liquid inside the bottle. Although that method makes it possible to measure the volume of a liquid inside a bottle, that technique is firstly not capable of measuring the real capacity of the bottle, and secondly not capable of measuring under standardized measurement conditions.

Patent application US 2010/303287 describes an X-ray apparatus adapted to determine whether an object contains a liquid. Although that document makes it possible to measure the volume of liquid contained inside a bottle, the technique described in that document presents the same drawbacks as patent application US 2014/211980.

The present invention seeks to remedy the drawbacks of the state of the art by proposing a novel method for determining the capacity of glass containers accurately and quickly.

Another object of the invention is to propose a method that is appropriate both for determining the capacity of containers and also for taking various other dimensional measurements of the container, in order to limit the duration of a container measurement cycle.

In order to achieve such objects, the method of the invention comprises the following steps:
a) using an X-ray computed-tomography apparatus to acquire a plurality of X-ray images of the container at different projection angles;
b) transmitting the X-ray images to a computer; and
c) analyzing the X-ray images with the computer.

According to the invention, the method consists in acquiring the X-ray images for an empty container in order to cause only the material of the container to appear in the X-ray images;
determining the support surface of the container; and
analyzing the X-ray images in order to:
  i) construct a digital model of the container from the X-ray images;
  ii) determine the inside surface of the digital model of the container;
  iii) position a filling level plane on the digital model of the container parallel to the support surface and at a nominal distance from the top of the digital model of the container; and
  iv) measure by calculation the inside volume of the digital model of the container as defined by the inside surface of the digital model and by the filling level plane, this measurement being the filling capacity of the container.

The method of the invention guarantees that standardized conditions for measuring the capacity of a container are complied with without any need to fill said container with a liquid.

Furthermore, the device of the invention may also include in combination one or more of the following additional characteristics.

In order to determine the volume of the digital model of the container, the following steps are performed:
a) using a plurality of X-ray images of the container to determine a complete set of slices of given thickness, each point of each slice containing a density measurement;
b) in each slice, determining the closed inside perimeter of the container as the limit of the zone of density equal to the density of air;
c) determining an inside volume for each slice corresponding to the product of the thickness of the slice multiplied by the area of the closed perimeter; and
d) determining the volume of the container as corresponding to at least the sum of the inside volumes of at least one series of connected slices.

In this variant implementation, the method consists in:
a) acquiring the X-ray images of the container while the container is standing via its bottom on a mechanical support surface and while it is being subjected between successive acquisitions of an X-ray image to a movement in rotation about an axis of rotation orthogonal to the mechanical support surface;
b) determining connected-together slices, each of which is defined by common planes parallel to the mechanical support surface; and c) determining the inside volume of the container by summing the inside volumes of all of the slices lying between the mechanical support surface and the filling level plane.

Advantageously, the method consists in determining the inside volume of the container by summing all of the complete slices lying between the mechanical support surface and the filling level plane, and by adding thereto:

when the filling level does not lie in a plane of a slice, the volume of a top end slice situated between the filling level plane and the common plane between said top end slice and the neighboring complete slice; and when the mechanical support surface does not lie in a plane of a slice, the inside volume of a bottom end slice situated between the mechanical support surface and the common plane between said bottom end slice and the neighboring complete slice, said internal volume then being defined by the inside surface of the bottom of the container.

In another variant implementation, the inside volume of the digital model of the container is determined by:

a) constructing a three-dimensional digital model of the container;

b) determining the inside surface of the three-dimensional digital model of the container as being the inside surface of the container;

c) positioning the filling level plane that closes the inside surface of the three-dimensional digital model of the container; and d) measuring by calculation the volume determined by the inside surface of the three-dimensional digital model and by the filling level plane, this volume corresponding to the filling capacity of the container.

In this variant, the following steps are performed:

a) positioning the three-dimensional digital model of the container standing on its bottom on a virtual support surface of the virtual space, which surface is considered as being horizontal by assumption; and b) positioning the filling level plane parallel to the plane of the virtual support surface so as to close the inside surface of the three-dimensional digital model at a distance from the top of the three-dimensional digital model of the container.

In a first implementation, the method comprises positioning the three-dimensional digital model of the container on the virtual support surface in such a manner that by simulating gravity, the three-dimensional digital model of the container, when filled virtually up to the filling level plane by a liquid of determined density, stands upright in static equilibrium on three points of its bottom in contact with the virtual support surface.

In another implementation, the method comprises positioning the three-dimensional digital model of the container on the virtual support surface in such a manner that by simulating gravity, the three-dimensional model of the container stands upright in static equilibrium on three points of its bottom in contact with the virtual support surface.

In another implementation, the container is considered as standing on a mechanical support surface while the X-rays are acquired, and the three-dimensional digital model of the container stands on the virtual support surface, which is merely the (virtual) representation of the known mechanical support surface. In other words, in this simplified implementation, the virtual support surface is the representation of the mechanical support surface in the virtual space. This means there is no need to perform the step of simulating gravity.

Advantageously, the top of the three-dimensional digital model of the container is determined as:

a) the point belonging to the three-dimensional digital model that is the furthest from the virtual support surface; or b) the point of intersection between a ring surface plane of the three-dimensional digital model and an axis of symmetry of said model, the axis of symmetry being substantially orthogonal to the virtual support surface and the ring surface plane being defined as:

i. a plane passing through three points of the ring surface;

ii. a mean plane of the ring surface; or iii. a plane positioned in static equilibrium on the ring surface.

Since, in order to measure the nominal capacity of the container, the filling level plane is positioned at a nominal distance from the top of the three-dimensional digital model, then for measuring the brimful capacity of the container, the filling level plane is positioned at zero distance from the top of the three-dimensional digital model.

According to another advantageous characteristic of the invention, the method consists in constructing a digital model of the container from X-ray images in order to determine at least one dimensional characteristic of said digital model of the container that is different from its capacity.

For example, the method consists in determining as dimensional characteristics of the digital model of the container: the thickness of the wall of the container; an outside diameter of the body of the container; an inside diameter of the neck of the container; the verticality of the body or of the neck of the container; and/or the flatness of the ring surface of the container.

Various other characteristics appear from the following description made with reference to the accompanying drawings, which show embodiments of the invention by way of non-limiting examples.

Figure 1:
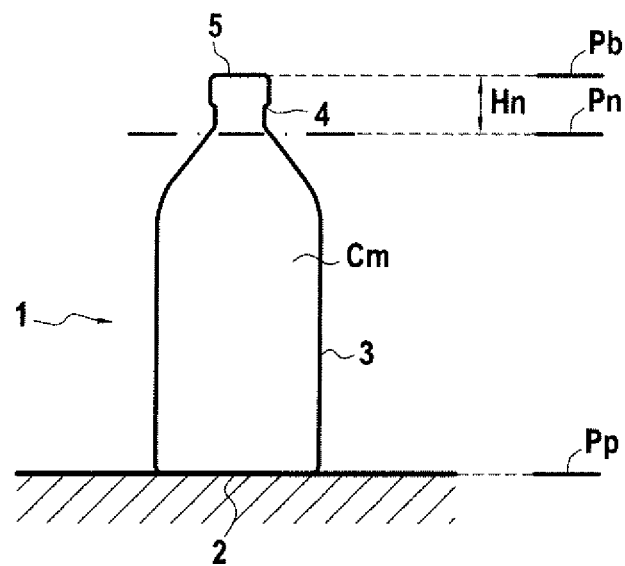
FIG. 1 is a view showing the capacity of a container being measured.

The invention provides a method of determining the capacity of glass containers 1 such as bottles, jars, or flasks made of glass. As can be seen in FIG. 1, a container 1 is a hollow object conventionally comprising a bottom 2 from which there rises a body 3 that is extended by a neck 4 terminated by a ring 5 defining the opening or mouth that enables the container to be filled or emptied. The capacity of the container 1 is the volume of liquid that it contains by means of the inside surface Sf of its wall when the container is standing on its bottom in static equilibrium under gravity on a horizontal plane referred to as the mechanical support surface Pp.

The brimful capacity of the container 1 corresponds to the volume of liquid filling the container up to the "ring" plane Pb that contains the ring 5 of the container. The nominal capacity Cn of the container 1 corresponds to the volume of liquid filling the container up to a level plane Pn for filling the liquid, which is situated at a determined height Hn below the ring plane Pb.

The method of the invention thus seeks to determine the capacity of containers 1 by using the computer-assisted tomographic technique, which is known as computed tomography (CT). This technique of non-destructive inspection by computed tomography is described in detail in the article "Computed tomography for dimensional metrology" J. P. Kruth et al., CIRP Annals—Manufacturing Technology 60 (2011) pp. 821-842.

In accordance with the invention, the capacity of containers 1 is determined while the containers 1 are empty, i.e. when they are not filled with liquid but rather with ambient air.

Figure 2A:
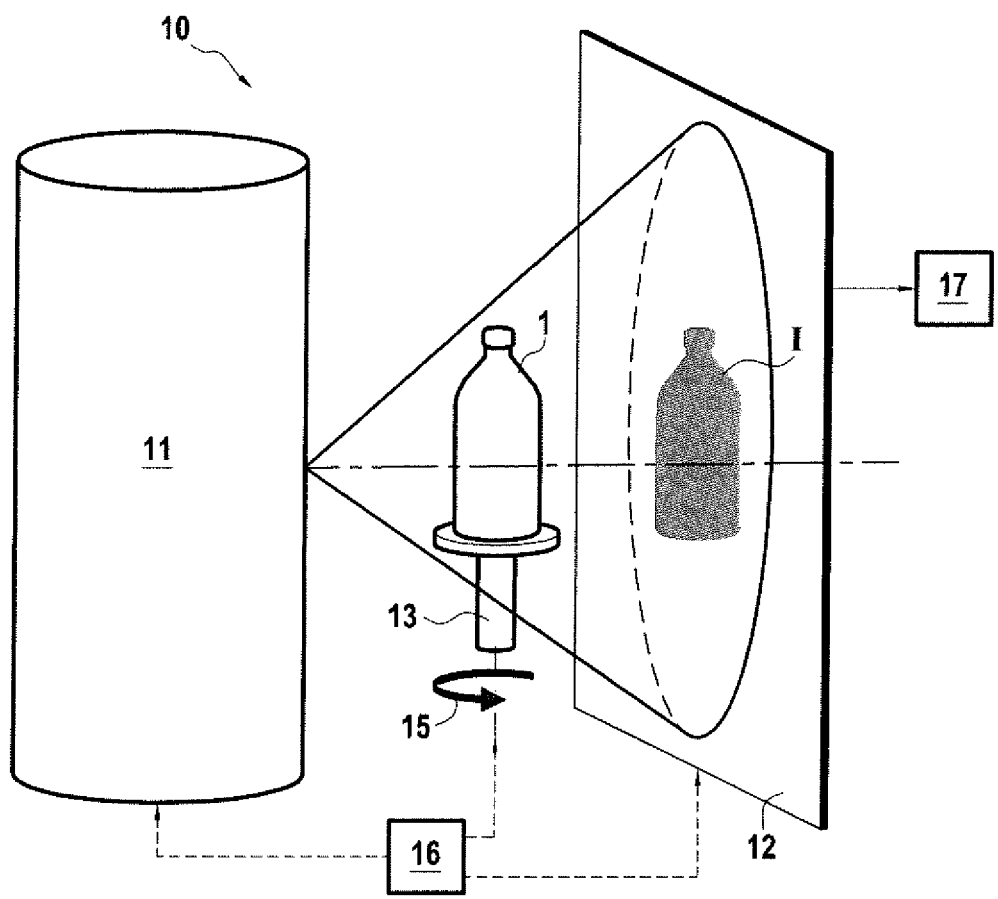
FIG. 2A is a diagrammatic view showing a computed-tomography apparatus for performing the measurement method of the invention and including an X-ray sensor of dimensions greater than the size of the container for inspection.
Figure 2B:
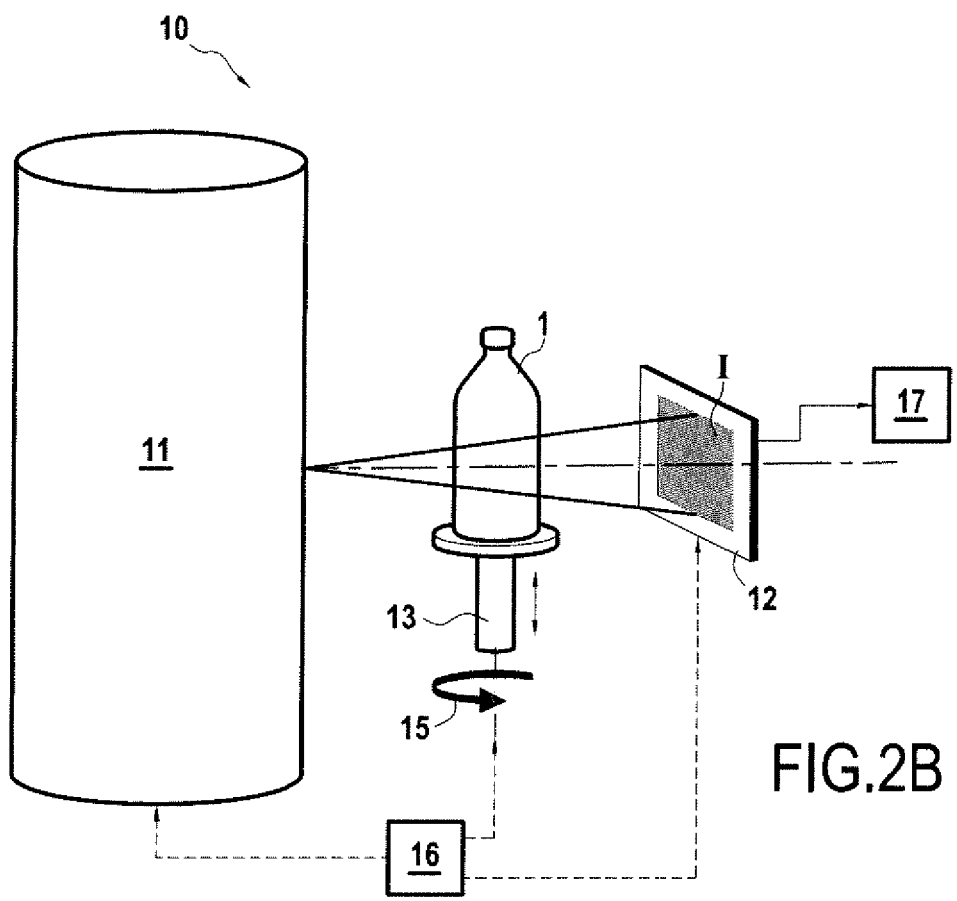
FIG. 2B is a diagrammatic view showing a computed-tomography apparatus for performing the measurement method of the invention and including an X-ray sensor of dimensions smaller than the size of the container for inspection.

As can be seen more clearly in FIGS. 2A and 2B, a computed-tomography apparatus 10 comprises in conventional manner an X-ray enclosure containing at least one source 11 for generating X-rays coming from its emission focus, together with at least one linear or matrix sensor 12 that is sensitive to X-rays. The apparatus 1 also has a support 13 serving as a mechanical support surface Pp for the container 1 and adapted to be positioned between the source 11 and the sensor 12, so that the container 1 is thus irradiated by X-rays. The X-rays passing through the material of the empty container 1 are attenuated by absorption and diffusion depending on the atomic weight and on the thickness of the material through which they pass. Since the container is empty, it is only the material of the container that attenuates the X-rays. The X-ray sensitive sensor 12 situated on the side of the container opposite from the tube receives the attenuated X-rays and delivers an attenuation image caused thereby, i.e. an X-ray image I of the wall of the container 1.

The apparatus 10 also has a movement system 15 for imparting relative movement between the container 1 and the pair constituted by the source 11 and by the sensor 12. In conventional manner, this system 15 causes the container 1 to move by a known amount relative to the source-sensor pair 11-12, which remains stationary. Advantageously, the movement system 15 serves to cause the container to revolve about a stationary axis of rotation that preferably, but not necessarily, coincides with the vertical axis of symmetry of the container.

The apparatus 10 also has a control unit 16 for controlling the source 11, the sensor 12, and the movement system 15 so as to enable the apparatus to operate and X-ray images to be obtained. Thus, the control unit 16 causes the container 1 to move relative to the source 11 and to the sensor 12 in a manner that is known, so as to cause projections to be taken of the container at various different angles. The control unit causes a plurality of X-ray images to be acquired during this movement. Thus, the container 1 is moved between successive X-ray image acquisitions in such a manner that the X-ray images are projections of the container on respective directions that are mutually different. The acquired X-ray images of the empty container are transmitted to a computer 17 for analysis and processing.

In the example shown in FIG. 2A, it should be observed that the sensor 12 presents a field of height that is greater than the size of the container 1. The movement system 15 is controlled to cause the container to revolve, typically on a turntable, and the unit 16 serves to acquire different projections of the container over 360° of rotation.

In the embodiment shown in FIG. 2B, the sensor 12 presents a field of height that is smaller than the size of the container 1. In this example, the movement system 15 is designed also to impart relative movement between the container 1 and the source 11 and/or the sensor 12 in vertical translation in order to scan the entire container 1.

For example, the movement system 15 serves to cause the container 1 to revolve and also to move in vertical translation relative to the source-sensor pair 11-12, which remains stationary. When the sensor 12 is a linear sensor with a horizontal field, the unit 16 causes the movement system to position the container in such a manner that the top end of the container is positioned in the field of the sensor 12. Thereafter, the unit 16 causes the container to revolve through one revolution and acquires projections of the container by means of the sensor during that revolution. The movement system 15 then moves the container downwards in translation through one incremental step prior to causing the container to revolve and causing projections of the container to be acquired. The movement and acquisition steps are renewed until the bottom end of the container is positioned in the field of the sensor 12.

When the sensor 12 is a horizontal field linear sensor, the unit 16 could alternatively control the movement system so as to impart helical movement to the container, continuously combining rotation about its axis with movement in translation along said axis, thereby enabling a multitude of radiographic images or projections of the container to be acquired.

A known computed-tomography apparatus as described above is sold by the supplier RX Solutions under the commercial name EasyTom.

Such a computed-tomography apparatus 10 serves to perform a method of determining the capacity of glass containers 1.

The method comprises various steps, the first of which consists in using the X-ray computed-tomography apparatus 10 to acquire a plurality of X-ray images I of the container 1 at different projection angles. This step is performed while the container 1 is empty. The following step consists in transmitting the X-ray images to the computer 17. Thereafter, the computer analyzes the X-ray images in order to determine the filling capacity of the container 1.

This analysis seeks:
to construct a digital model of the container 1 from the X-ray images of the empty container 1;
to determine the inside surface Sf of the digital model of the container;
to position a filling level plane Pn in the digital model of the container parallel to the support surface and at a distance Hn from the top of the digital mode of the container; and
to measure by calculation the inside volume of the digital model of the container as defined by the inside surface Sf and by the filling level plane, it being understood that this measurement corresponds to the filling capacity Cn of the container.

Since the X-ray images are taken while the container 1 is empty, the X-ray images I show only the material of the container as contrasted relative to air, which has attenuation that is negligible compared with that of the glass constituting the container. The inside surface Sf of the container can then be determined easily and accurately in the digital model M of the container. A volume is thus determined with high accuracy on the basis of the determined inside surface Sf of the empty container.

The description below relates to two variant implementations for constructing the digital model M. In the advantageous first variant implementation shown in FIG. 3, the digital model M that is constructed for determining the inside surface Sf is a three-dimensional model, and the filling level plane Pn is parallel to a support surface, which is a virtual support surface or reference plane Pr. It should be observed that this virtual support surface may correspond to the representation (in virtual space) of the mechanical support surface on which the container stands during X-ray acquisition. In the second variant shown in FIGS. 4A to 4D, digital model M for determining the inside surface Sf is constructed by summing slices of the container, and the filling level plane Pn is parallel to a support surface that corresponds to the mechanical support surface of the container.

Figure 3:
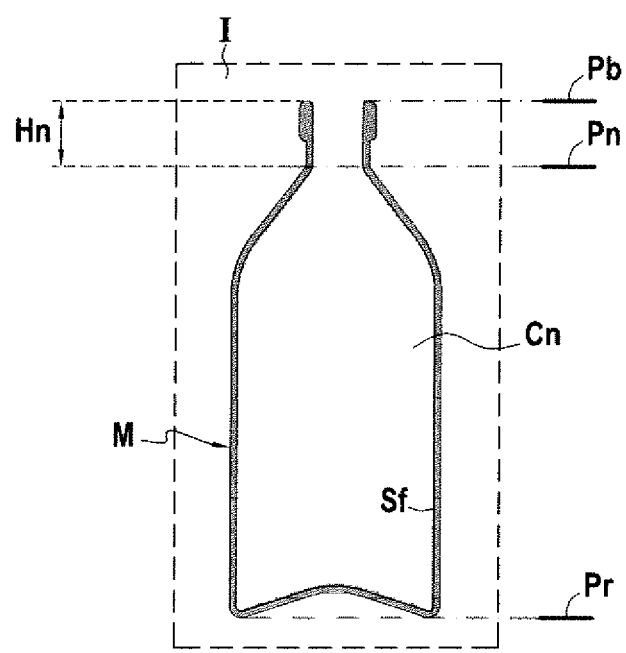
FIG. 3 shows an example of a three-dimensional digital model of a container obtained by a tomography apparatus.

In a first variant implementation shown in FIG. 3, the method of the invention consists in constructing a three-dimensional digital model M of the container from the X-ray images in order to determine the filling capacity of the container.

It should be recalled that analyzing the X-ray images of the empty container 1 makes it possible to reconstruct a three-dimensional digital model of the container in the form of a set of "voxels", i.e. unit volumes of value given by the X-ray absorption that each of them creates, thereby leading to a volume distribution function that is very similar to a density distribution.

Making a three-dimensional digital model is the way in which three-dimensional objects are represented and manipulated in a computer memory, in terms of mathematics, graphics, and data structure. The three-dimensional digital model is analyzed by being segmented into regions of different densities in order to measure dimensions (lengths, areas, thicknesses, volumes). After segmentation, the three-dimensional digital model may remain a volume model, or it may be transformed into a surface model, i.e. a model in which the surfaces lying between homogeneous volumes are modeled.

In surface models, an object is defined by its envelope, its boundary surfaces, thus making it possible to assess concepts of inside/outside, and the closed surfaces that define volumes, to which weight can be allocated, for example, so long as the density of the material is known. Surfaces can be modeled in various ways, such as for example modeling by polygons, by curves, or by parametric surfaces (cylinders, cones, spheres, splines, . . . ), or by subdividing surfaces. Using a mesh of polyhedra, e.g. of triangles, the surfaces of objects are represented by sets of plane facets that are connected together via their edges.

Volume modeling consists in basing the representation on sets of identical individual volumes referred to as "voxels".

Various approaches exist for measuring lengths.

In a first method based on volume, it is possible to scan the volume model along a line or a bundle of lines in order to determine the material/air boundary voxels.

In a second method based on surface, it is possible to calculate a segment having ends that are the intersections of a line with the surface of a surface model. Topological problems are solved in satisfactory manner by algorithms. A point is unique. Finally, a mixed or combined method consists in transforming the volume model into a surface model and then in applying the second method.

After this three-dimensional digital model M of the container has been constructed from the X-ray images, the method consists in determining the inside surface Sf of the three-dimensional digital model of the container as corresponding to the inside surface of the container.

The method then consists in positioning the filling level plane Pn so as to close the inside surface of the three-dimensional digital model of the container. Thus, a closed surface is defined that surrounds or completely envelopes the filling volume of the container.

Thereafter, the method consists in using calculation to measure the inside volume defined by this closed surface, i.e. the inside surface of the three-dimensional digital model and of the filling level plane. Specifically, the inside volume defined by this closed surface corresponds to an internal filling volume of the container up to the filling level.

According to an advantageous implementation characteristic, the method consists in positioning the three-dimensional digital model M of the container placed on its bottom on a reference plane Pr of the virtual space, which plane is by assumption taken to be horizontal. Since the reference plane simulates the container standing on the mechanical support surface, this reference plane Pr is also referred to as a "virtual support surface" in the description below of this variant implementation.

In another implementation, the virtual support surface is a representation of the mechanical support surface in the virtual space.

Thereafter, the filling level plane Pn is positioned parallel to the virtual support surface or reference plane Pr at a distance Hn from the top of the three-dimensional digital model of the container.

In an advantageous implementation variant, the method consists in positioning the three-dimensional model M of the container on the virtual support surface or reference plane Pr so that by simulating gravity, the three-dimensional model of the container stands upright in static equilibrium on three points of its bottom that are in contact with the virtual support surface or reference plane Pr. This technique takes account of the density of the material constituting the container.

In another advantageous implementation variant, the method consists in positioning the three-dimensional digital model M of the container on the virtual support surface or reference plane Pr so that by simulating gravity the three-dimensional digital model of the container filled virtually up to the filling level plane by a liquid of determined density stands upright in static equilibrium on three points of its bottom in contact with the virtual support surface or reference plane Pr. This method of simulation approaches as closely has possible to the reality of a liquid-filled container standing on a support surface defining the filling level plane.

When the filling level plane Pn is positioned at a distance Hn from the top of the three-dimensional digital model M of the container, the top of the three-dimensional digital model M of the container is determined as being the point of the three-dimensional digital model that is furthest from the virtual support surface or reference plane Pr or as the point where a ring surface plane Pb of the three-dimensional digital model intersects an axis of symmetry of said model. Under such circumstances, the axis of symmetry is substantially orthogonal to the virtual support surface or reference plane Pr and the ring surface plane Pb is defined as a plane passing through three points of the ring surface, or a mean plane of the ring surface, or a plane positioned in static equilibrium on the ring surface. Naturally, the method of the invention can be used for a container that does not have an axis of symmetry.

It follows from the above description that is in order to measure the brimful capacity of the container, the method consists in positioning the filling level plane Pn at zero distance Hn from the top of the three-dimensional digital model.

In a variant of the method, in order to measure the brimful capacity of the container, the method consists in considering that the filling level plane Pn coincides with the ring surface plane Pb.

On the same lines, in order to measure the nominal capacity Cn of the container, the method consists in positioning the filling level plane Pn at a nominal distance Hn from the top of the three-dimensional digital model.

Figure 4A:
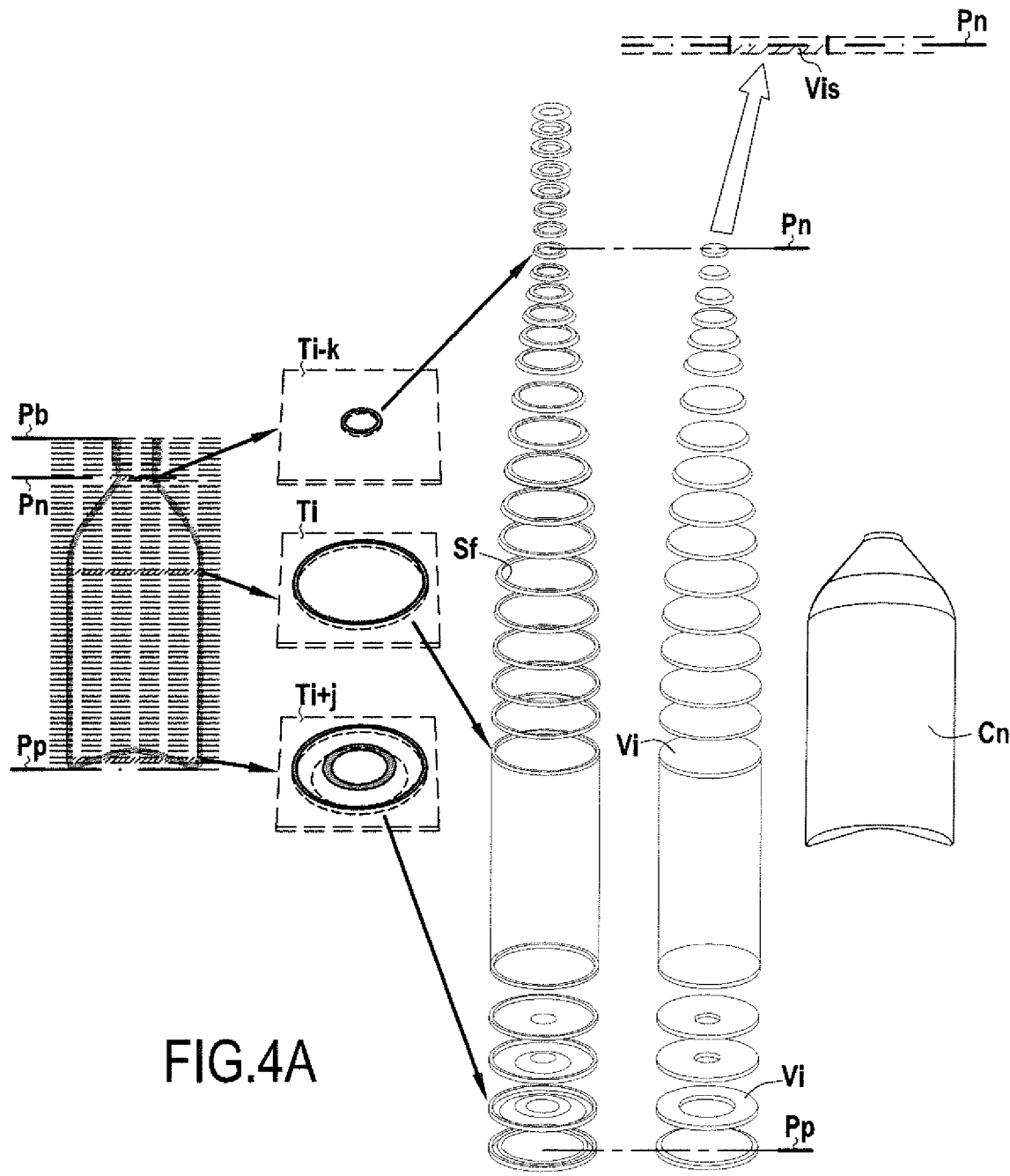
FIG. 4A shows an example of a digital model of a container obtained by summing slices.

In a second implementation variant shown in FIG. 4A, the method of the invention seeks to construct a digital model M of the container from X-ray images of the empty container in order to determine the volume of the digital model of the container.

In order to determine the volume of the digital model of the container, the method consists in using a plurality of X-ray images of the container to determine a complete set of slices Ti of given thickness, considering that each point of each slice contains a density measurement. Thereafter, the method consists in determining the inside surface Sf of the container within each slice as being the limit or boundary of the zone of density equal to the density of air (which is almost zero). The method consists in determining an inside volume Vi for each slice Ti, this inside volume Vi corresponding to the product of the thickness of the slice multiplied by the area of the closed perimeter of the container. Finally, the method consists in taking account of a series of connected slices and in summing the volumes of these connected slices in order to determine the volume of the container.

According to an advantageous embodiment characteristic, the method consists in acquiring the X-ray images of the container while the container is standing on its bottom on the mechanical support surface Pp and while it is being subjected, between successive X-ray image acquisitions, to turning about an axis of rotation orthogonal to the mechanical support surface. The method consists in determining connected-together slices, each defined by common planes that are parallel to the mechanical support surface Pp. The volume of the container is determined by summing the volumes of all of the slices lying between the mechanical support surface and the filling level plane.

Advantageously, the method consists in determining the inside volume by summing all of the complete slices lying between the mechanical support surface and the filling level plane, and by adding thereto the inside volumes of end slices situated at the level of the filling level plane Pn and at the level of the mechanical support surface Pp.

Thus, when the filling level plane Pn does not coincide with the plane of a slice, the internal volume of the container has added thereto the internal volume Vis of a top end slice that is situated between the filling level plane Pn and the common plane between said top end slice and the neighboring complete slice.

Figure 4B:
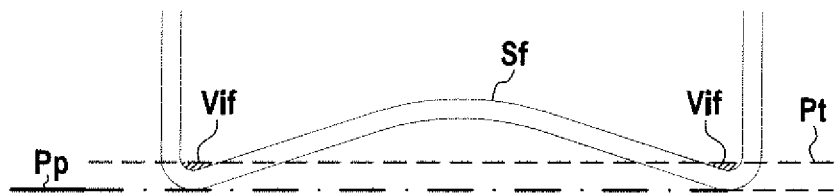
FIGS. 4B and 4C are views showing how account is taken of the inside volume of the bottom end slice of a container as a function of the position of the end slice.
Figure 4C:
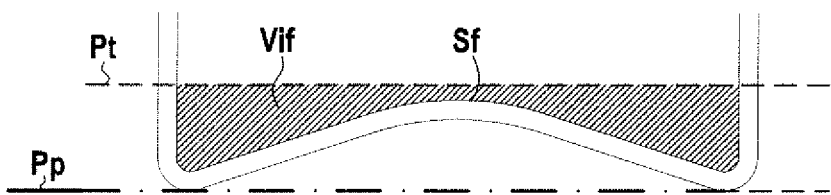

Likewise, as shown in FIGS. 4B and 4C, when the mechanical support surface Pp does not lie in the plane of a slice, the volume has added thereto the inside volume Vif of a bottom end slice situated between the mechanical support surface Pp and the common plane Pt between said bottom end slice and the neighboring complete slice. Under such circumstances, the inside volume Vif of a bottom end slice is defined by the inside surface of the bottom Sf of the container.

Figure 4D:
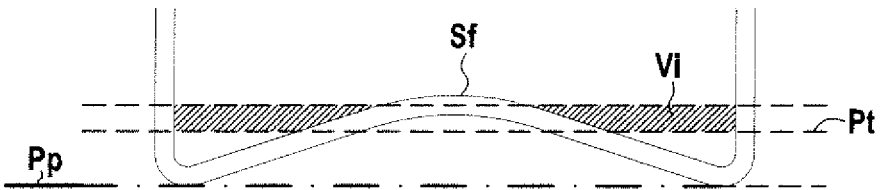
FIG. 4D is a view explaining how account is taken of the volume of a slice of a container that passes through the punt of the container.

FIG. 4D shows the situation of a bottle bottom having a punt, i.e. that is strongly curved in its center by a so-called punt. It is then considered that the inside volume Vi of a slice situated at the level of the punt is determined by taking the punt into consideration and thus the inside surface Sf of the bottom of the bottle defines the inside volume Vi of the slice.

The measurement of the filling volume as obtained by the method can also be modified by adding or subtracting a volume that corresponds to the shape of the meniscus that a filling liquid of known viscosity would have. For this purpose, the shape of the inside surface of the container can be taken into account.

The method of the invention presents the advantage of being combined with other dimensional measurements taken by the same X-ray computed-tomography apparatus 10. It is possible to measure the capacities of containers of any shape, and it is not sensitive to the color of the glass.

It should be observed that the method is for use in glassmaking in order to inspect bottle fabrication. There is therefore no practical advantage in filling the containers. On the contrary, by measuring a container that is empty, its inside surface can be determined more accurately because of the high contrast between the attenuation of glass compared with the attenuation of air, which is practically zero, so the X-ray images end up storing only the attenuation due to the glass.

Thus, a digital model of the empty container is constructed from X-ray images so as to determine at least one dimensional characteristic of said digital model of the container, other than its capacity. The method consists in determining as dimensional characteristics of the digital model of the container: the thickness of the wall of the container; an outside diameter of the body of the container; an inside diameter of the neck of the container; the verticality of the body of the container or of the neck of the container; and/or the flatness of the surface of the ring of the container. The method of the invention thus makes it possible to obtain the capacity of a container and also to obtain other dimensional characteristics of the container.

The invention is not limited to the examples described and shown since various modifications may be made thereto without going beyond its ambit.

The invention claimed is:

1. A method of determining the capacity of glass containers (1), the method comprising the following steps:
   using an X-ray computed-tomography apparatus (10) to acquire a plurality of X-ray images (I) of the container at different projection angles;
   transmitting the X-ray images to a computer (17); and
   analyzing the X-ray images with the computer;
   the method being characterized by:
   acquiring the X-ray images (I) for an empty container in order to cause only the material of the container to appear in the X-ray images;
   determining the support surface of the container; and
   analyzing the X-ray images in order to:
      construct a digital model (M) of the container from the X-ray images;
      determine the inside surface (Sf) of the digital model of the container;
      position a filling level plane (Pn) on the digital model of the container parallel to the support surface and at a nominal distance (Hn) from the top of the digital model of the container; and measure by calculation the inside volume of the digital model of the container as defined by the inside surface (Sf) of the digital model and by the filling level plane, this measurement being the filling capacity (Cn) of the container.

2. A method according to claim 1, characterized in that in order to determine the volume of the digital model of the container, the following steps are performed:
   a) using a plurality of X-ray images of the container to determine a complete set of slices (T) of given thickness, each point of each slice containing a density measurement;
   b) in each slice (T), determining the closed inside surface (Sf) of the container as the limit of the zone of density equal to the density of air;
   c) determining an inside volume for each slice corresponding to the product of the thickness of the slice multiplied by the closed inside surface; and
   a) determining the volume of the container as corresponding to at least the sum of the inside volumes of at least one series of connected slices.

3. A method according to claim 2, characterized in that it consists in:
   a) acquiring the X-ray images of the container while the container is standing via its bottom on a mechanical support surface and while it is being subjected between successive acquisitions of an X-ray image to a movement in rotation about an axis of rotation orthogonal to the mechanical support surface;
   b) determining connected-together slices, each of which is defined by common planes parallel to the mechanical support surface; and
   c) determining the inside volume of the container by summing the inside volumes of all of the slices lying between the mechanical support surface and the filling level plane.

4. A method according to claim 3, characterized in that it consists in determining the inside volume of the container by summing all of the complete slices lying between the mechanical support surface and the filling level plane, and by adding thereto:
   when the filling level does not lie in a plane of a slice, the volume (Vis) of a top end slice situated between the filling level plane (Pn) and the common plane between said top end slice and the neighboring complete slice; and
   when the support surface does not lie in a plane of a slice, the inside volume (Vif) of a bottom end slice situated between the support surface (Pp) and the common plane between said bottom end slice and the neighboring complete slice, said internal volume then being defined by the inside surface (Sf) of the bottom of the container.

5. A method according to claim 1, characterized in that in order to determine the inside volume of the digital model of the container, the following steps are performed:
   a) constructing a three-dimensional digital model (M) of the container;
   b) determining the inside surface (Sf) of the three-dimensional digital model of the container as being the inside surface of the container;
   c) positioning the filling level plane that closes the inside surface of the three-dimensional digital model of the container; and
   d) measuring by calculation the volume determined by the inside surface of the three-dimensional digital model and by the filling level plane, this volume corresponding to the filling capacity (Cn) of the container.

6. A method according to claim 5, characterized by:
   a) positioning the three-dimensional digital model (M) of the container standing on its bottom on a virtual support surface (Pr) of the virtual space, which surface is considered as being horizontal by assumption; and
   b) positioning the filling level plane (Pn) parallel to the plane of the virtual support surface so as to close the inside surface of the three-dimensional digital model at a distance (Hn) from the top of the three-dimensional digital model of the container.

7. A method according to claim 6, characterized by positioning the three-dimensional digital model of the container on the virtual support surface in such a manner that by simulating gravity, the three-dimensional digital model of the container, when filled virtually up to the filling level plane (Pn) by a liquid of determined density, stands upright in static equilibrium on three points of its bottom in contact with the virtual support surface.

8. A method according to claim 6, characterized by positioning the three-dimensional digital model of the container on the virtual support surface in such a manner that by simulating gravity, the three-dimensional model of the container stands upright in static equilibrium on three points of its bottom in contact with the virtual support surface.

9. A method according to claim 6, characterized in that the three-dimensional digital model (M) of the container is positioned on its bottom on a virtual support surface that is the representation in the virtual space of the mechanical support surface.

10. A method according to claim 6, characterized in that the top of the three-dimensional digital model of the container is determined as:
    a) the point belonging to the three-dimensional digital model that is the furthest from the virtual support surface; or
    b) the point of intersection between a ring surface plane of the three-dimensional digital model and an axis of symmetry of said model, the axis of symmetry being substantially orthogonal to the virtual support surface and the ring surface plane being defined as:
       i) a plane passing through three points of the ring surface;
       ii) a mean plane of the ring surface; or
       iii) a plane positioned in static equilibrium on the ring surface.

11. A method according to claim 6, characterized in that it consists in positioning the filling level plane (Pn) at zero distance (Hn) from the top of the three-dimensional digital model in order to measure the brimful capacity of the container.

12. A method according to claim 1, characterized in that it consists in constructing a digital model of the container from X-ray images in order to determine at least one dimensional characteristic of said digital model of the container that is different from its capacity.

13. A method according to claim 12, characterized in that it consists in determining as dimensional characteristics of the digital model of the container:
    the thickness of the wall of the container; an outside diameter of the body of the container; an inside diameter of the neck of the container; the verticality of the body or of the neck of the container; and/or the flatness of the ring surface of the container.

* * * * *